(No Model.) 5 Sheets—Sheet 1.
J. F. APPLEBY.
GRAIN CARRIER FOR LOW DOWN GRAIN BINDERS.
No. 323,386. Patented Aug. 4, 1885.

Witnesses:
R. C. Howes.
M. L. Adams.

Inventor:
John F. Appleby
Per Edw. E. Swiney
Atty.

(No Model.) 5 Sheets—Sheet 2.

J. F. APPLEBY.
GRAIN CARRIER FOR LOW DOWN GRAIN BINDERS.

No. 323,386. Patented Aug. 4, 1885.

(No Model.)  5 Sheets—Sheet 3.
J. F. APPLEBY.
GRAIN CARRIER FOR LOW DOWN GRAIN BINDERS.
No. 323,386.  Patented Aug. 4, 1885.

Witnesses:
R. C. Howes
M. L. Adams

Inventor:
John F. Appleby,
Per Edw. E. Luney,
atty.

(No Model.)  5 Sheets—Sheet 4.

J. F. APPLEBY.
GRAIN CARRIER FOR LOW DOWN GRAIN BINDERS.

No. 323,386.  Patented Aug. 4, 1885.

(No Model.)  5 Sheets—Sheet 5.
J. F. APPLEBY.
GRAIN CARRIER FOR LOW DOWN GRAIN BINDERS.
No. 323,386.   Patented Aug. 4, 1885.
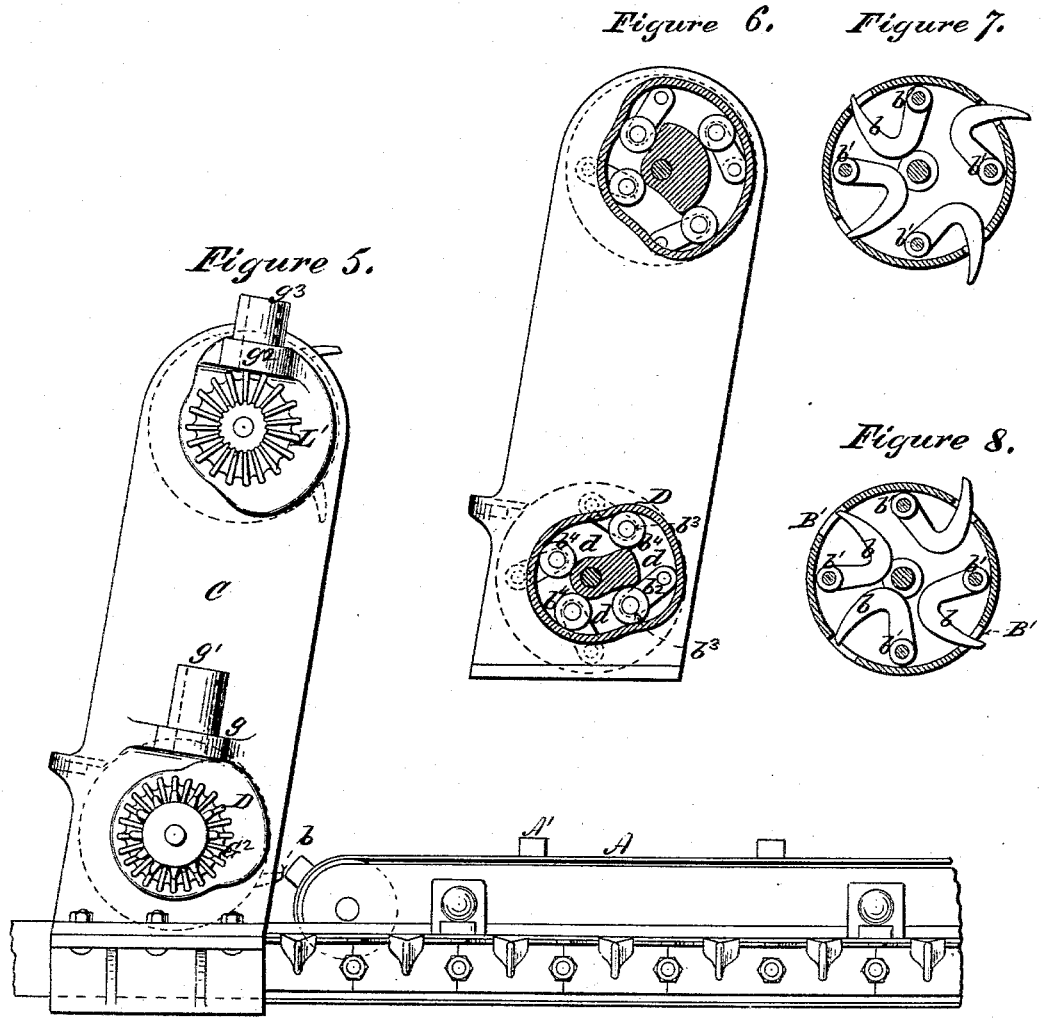
Witnesses:
R. C. Howes
M. L. Adams
Inventor:
John F. Appleby,
Per Edw. E. Quimby,
Atty.

United States Patent Office.

JOHN F. APPLEBY, OF MINNEAPOLIS, MINNESOTA, ASSIGNOR TO THE MINNEAPOLIS HARVESTER WORKS, OF SAME PLACE.

GRAIN-CARRIER FOR LOW-DOWN GRAIN-BINDERS.

SPECIFICATION forming part of Letters Patent No. 323,386, dated August 4, 1885.

Application filed December 13, 1883. (No model.)

*To all whom it may concern:*

Be it known that I, JOHN F. APPLEBY, of Minneapolis, Minnesota, have invented certain Improvements in Grain-Carriers for Low-Down Grain-Binders, of which the following is a specification.

In so-called "low-down" grain-binders the grain is delivered by the platform-carrier to a slightly-elevated deck, upon which it is moved along to a point within the range of movement of the packing and binding instrumentalities.

My invention relates to the employment of a spider cylinder or cylinders with retracting teeth for moving the grain from the platform-carrier to the binder-deck, and a butt-hastening device consisting of arms vibrating upon orbitally-moving axes in vertical planes and supported upon an adjustable butt-board, which also serves to support the crank-shaft for vibrating the arms, and the necessary intermediate gearing for rotating the crank-shaft from an upright shaft, which constitutes the axis upon which the butt-board is oscillated for adjustment.

Figure 1:
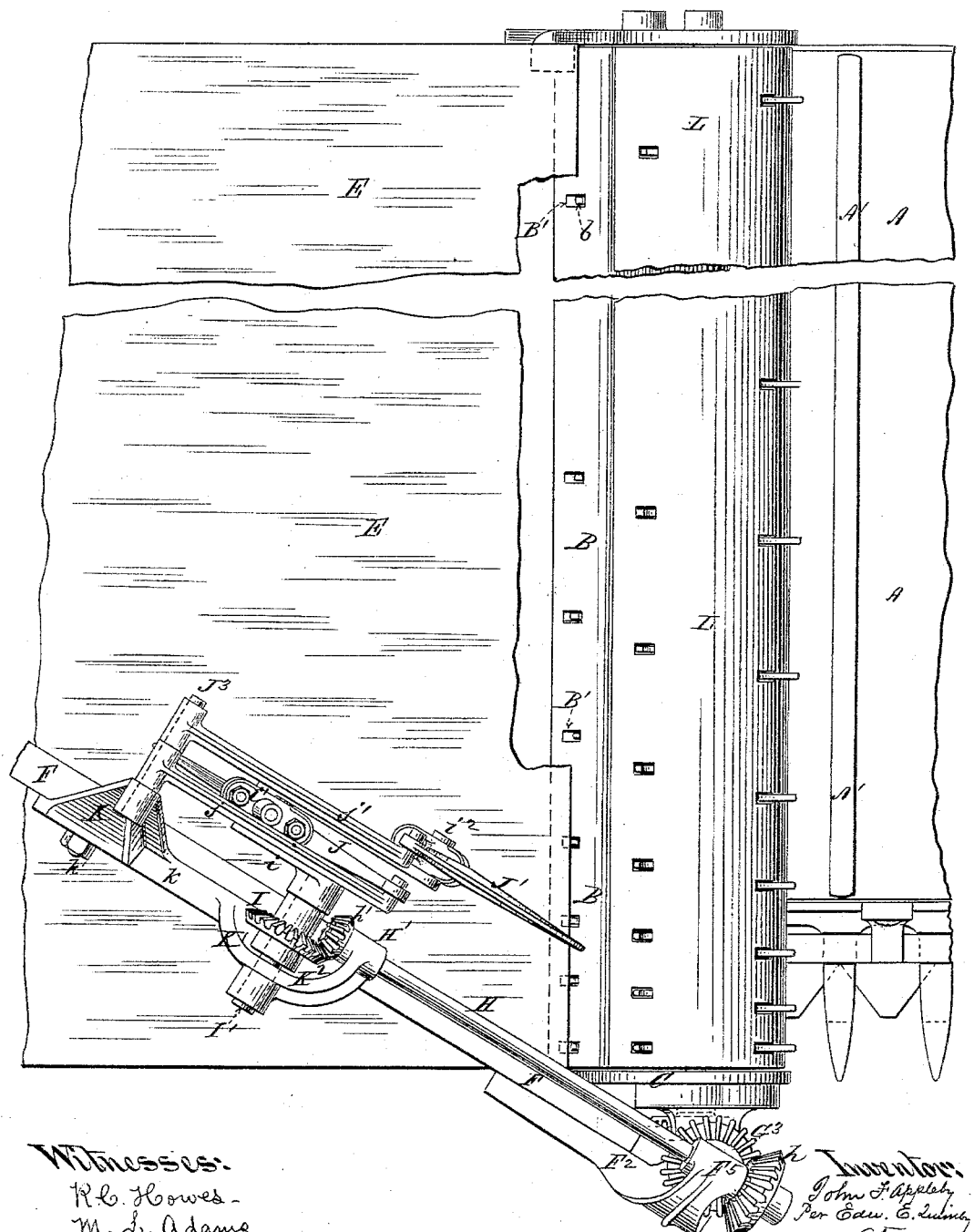
Figure 2:
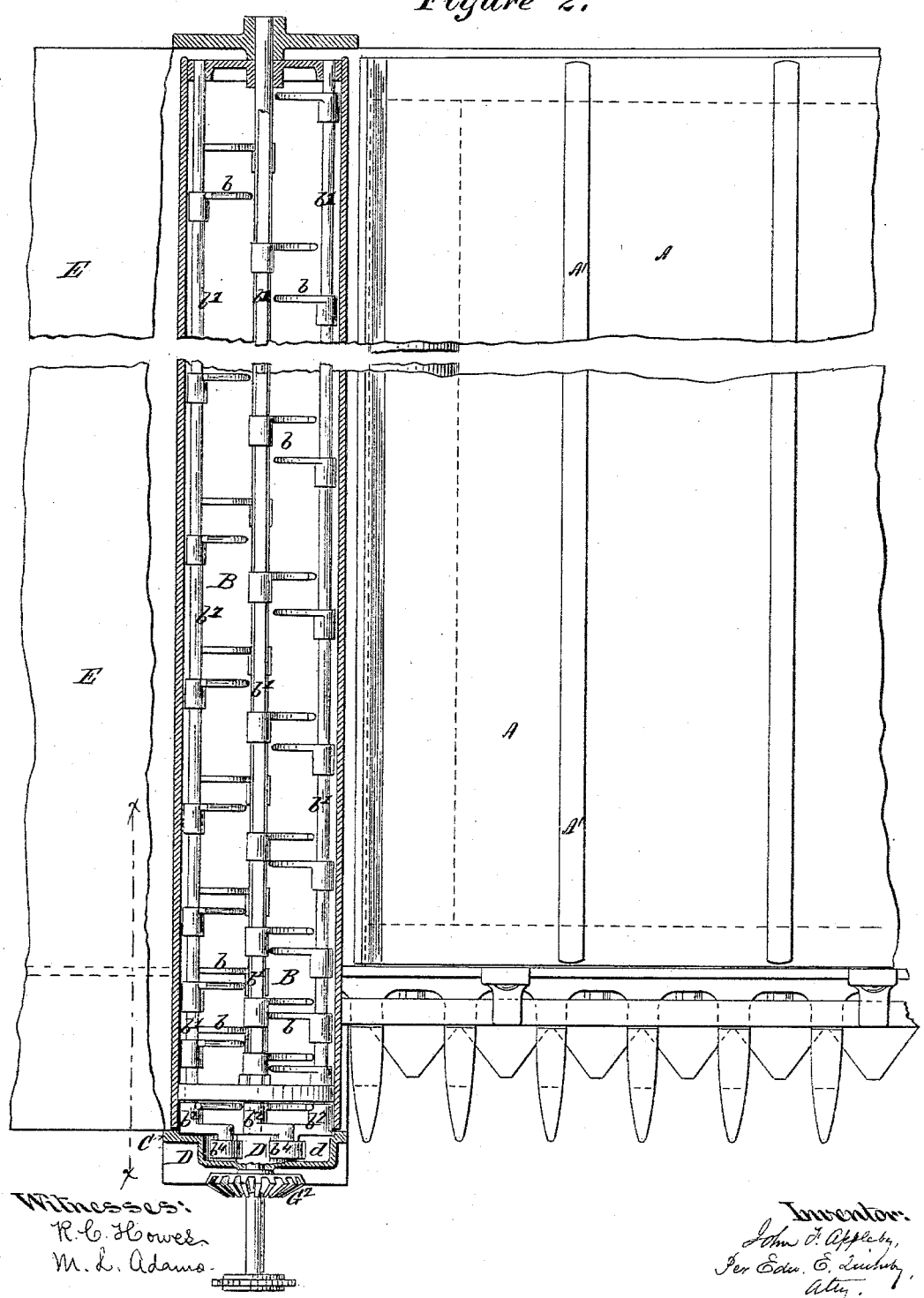
Figure 3:
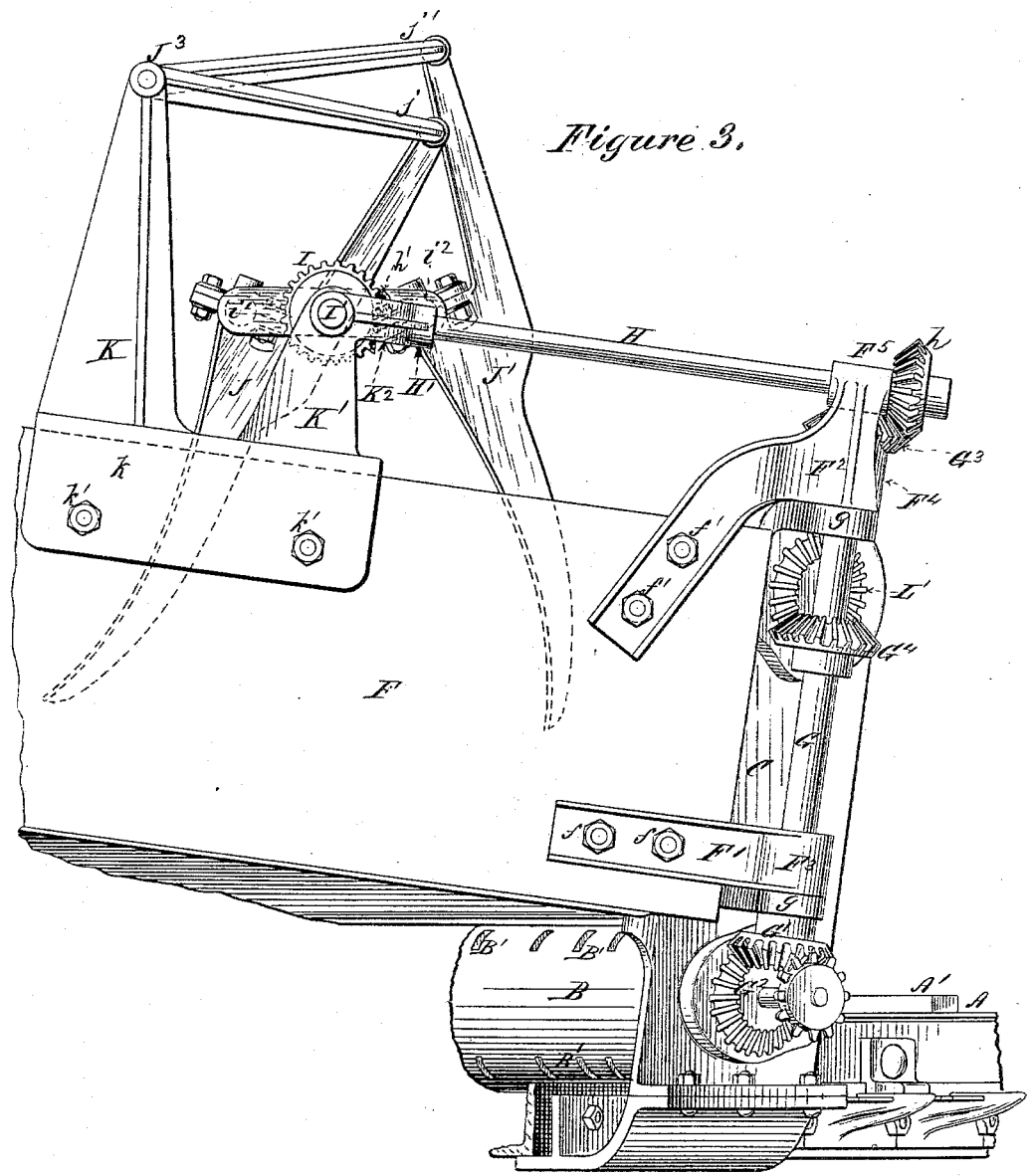
Figure 4:
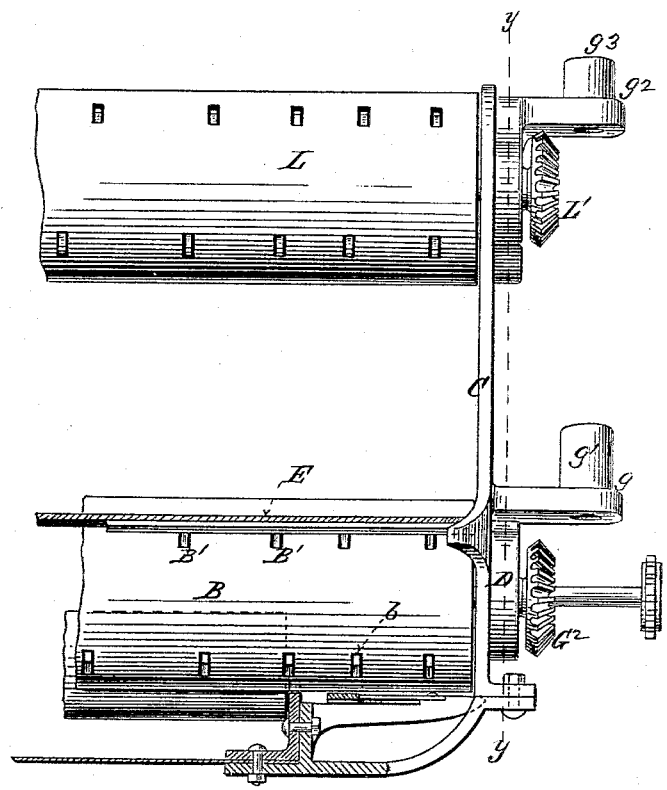

The accompanying drawings, representing those portions of a low-down self-binding harvester necessary to illustrate the application of my invention, are as follows:

Figure 1 is a top view of the spider-cylinders and adjoining portions of the platform and binder-deck. Fig. 2 is a longitudinal section of the lower spider-cylinder, the adjoining portions of the platform and binder-deck being in plan. Fig. 3 is a front elevation of the forward portion of the butt-board and adjoining parts of the machine. Fig. 4 is a vertical section through the line $x$ $x$ on Fig. 2, affording a side view of portions of the two spider-cylinders and the standard in which the front ends of the spider-cylinders have their bearings, also showing the boxes for the vertical shaft by which motion is transmitted from one spider-cylinder to the other. Fig. 5 is a front elevation of the parts shown in Fig. 4, showing the portions of the platform-carrier and cutters adjoining the lower spider-cylinder. Fig. 6 is a vertical section through the line $y$ $y$ on Fig. 4, showing the stationary cams which control the positions of the retracting teeth of the spider-cylinders. Fig. 7 is a transverse section of the upper spider-cylinder, showing the positions assumed by the teeth when the crank-pins of the rock-shafts to which the teeth are affixed respectively occupy the positions in the cam-groove in which they are represented in Fig. 6. Fig. 8 is a transverse section of the lower spider-cylinder, showing the positions which its teeth occupy when the crank-pins of the shafts to which they are affixed respectively occupy the positions in the cam-groove in which they are represented in Fig. 6.

In the drawings I have shown two spider-cylinders, one above the other, each provided with retracting teeth, the space between the two cylinders being for the passage of grain. The upper cylinder may in some cases be dispensed with, but will be found useful for employment in those cases in which, owing to the condition of the standing grain, it does not after being cut fall symmetrically across the platform. In such cases the upper spider-cylinder will be found useful in preventing any accumulation of grain at the edge of the binder-deck adjoining the platform. The platform is provided with the usual carrier-belt, A, driven by means of sprocket-gearing in the usual manner, and is preferably provided with the transverse slats A'. The lower spider-cylinder, B, is mounted upon a horizontal shaft provided with bearings in the standard C, forming a part of the frame of the machine immediately adjoining the platform-carrier, and is driven from any convenient part of the harvester-gearing by means of a chain engaging a sprocket-wheel preferably affixed to its front end, as shown. The shell of the lower cylinder is provided with the apertures B', to allow for the projection through the shell of the retracting teeth $b$, respectively. The teeth $b$ are affixed to the longitudinal rock-shafts $b'$, which are provided with bearings within the shell of the cylinder, and rotate therewith. At its forward end the shell of the cylinder B is open, and abuts against the standard C, which is affixed to the frame of the machine, and in which the front end of the lower spider-cylinder shaft has its bearing. To the rear side of the standard C there is affixed the stationary face-cam D. The rock-shafts $b'$ are provided upon their front ends with the crank-arms $b^2$, in which are affixed the crank-pins $b^3$, inserted in the anti-friction rollers $b^4$, which are engaged by the cam-groove $d$ in the face-cam D. It will thus be seen that in addition to the orbital motion of the teeth-shafts $b'$ they have an oscillating motion upon their own axes, resulting from the engagement of their cranks with the stationary cam-groove $d$, by which the teeth $b$ are made to project from the shell of the cylinder B as they approach the top of the platform-carrier, and are retracted into the shell when, by the rotation of the cylinder, they have been carried over to a point nearly opposite the binder-deck E. The stalks of grain delivered by the platform-carrier are caught by the projecting teeth $b$, and as the cylinder B revolves are carried upward and over and deposited upon the deck E. As the teeth $b$ are retracted just before they arrive at the level of the deck E, they are prevented from drawing the grain into the space between the cylinder B and the edge of the deck E. It will be seen that the binder-deck E is represented as inclined toward the platform. This inclination, of course, may be greater or less, as desired. The butt-board F is adjustable upon an axis at its inner end, which is perpendicular to the plane of the binder-deck E. This axis is afforded by the inclined shaft G, provided with bearings in the boxes $g$ $g^2$, cast upon the outer side of the standard C, and having affixed to its lower end the miter-gear G', which meshes into and is driven by the miter-gear $G^2$ of the lower spider-cylinder. The connection of the butt-board F with its axis is afforded by the eye-bars F' and $F^2$, which are secured to the butt-board by means of the bolts and nuts $f$ $f$ and $f'$ $f'$. The eye $F^3$ of the lower eye-bar, F', encircles the hollow boss $g'$, cast upon the upper side of the box $g$, which affords the lower bearing for the inclined shaft G. The eye $F^4$ of the upper eye-bar, $F^2$, encircles the hollow boss $g^3$, cast upon the upper side of the box $g^2$, which affords the upper bearing for the shaft G. The eye-bar $F^2$, as will be seen, is bolted diagonally across the butt-board F, and its upper extremity bends backward and terminates in the hollow box $F^5$, which affords the bearing for the inner end of the shaft H. This end of the shaft H has affixed to it the miter-gear $h$, which meshes into the miter-gear $G^3$ upon the upper end of the shaft G. The end of the shaft H toward the drive-wheel is provided with the bevel-pinion $h'$, which meshes with and drives the bevel-gear I, affixed to the horizontal crank-shaft I', provided upon its rear end with the double crank $i$, having the crank-pins $i'$ and $i^2$, which are respectively inserted in and constitute the orbitally-moving axes of the vibrating butt-hastening arms J and J', the upper ends of which are linked by means of eye-bars $j$ and $j'$, respectively, to the horizontal pivot $J^3$, fastened to the upper end of the standard K, projecting upward from the plate $k$, which is secured to the butt-board by the bolts and nuts $k'$ $k'$. Another standard, K', projects upward from the plate $k$, and affords a bearing for the horizontal shaft I', and is provided with the curved arm $K^2$, terminating in the box H', which affords the bearing for the drive-wheel end of the shaft H. By this organization of the parts the butt-hastening arms J and J' vibrate in planes which are parallel with the butt-board F, and, together with mechanism by which they are supported and vibrated, are supported upon and are adjustable with the butt-board F.

In order to prevent the possible piling up of the grain at the drive-wheel end of the cutter-bar, the upper spider-cylinder, L, may be employed. This cylinder may be driven, by means of a miter-gear, L', upon the front end of its shaft, from the miter-gear $G^4$, keyed to the shaft G, as shown.

It will be seen that the direction of rotation of the spider-cylinder L is the reverse of that of the spider-cylinder B, and that the spider-cylinder L contains the same arrangement of retracting teeth as that contained by the spider-cylinder B, which has been described.

It will be observed on reference to Fig. 1 that the teeth $b$ at the front end of the spider-cylinder are closer together than those at the rear end thereof; and it will also be seen that the teeth of each series are so arranged upon the rock-shaft upon which they are mounted that they are interplaced relatively to the teeth mounted upon the adjoining rock-shafts, whereby teeth mounted upon different rock-shafts move in different transverse planes, no two teeth moving in the same plane.

The object in the multiplicity of teeth at the forward end of the spider-cylinder, and in their arrangement in different planes, is to insure the catching of those stalks of grain which may fall upon the platform unsymmetrically in positions approximating parallelism with the cutter-bar, as is sometimes the case when the machine is employed for cutting leaning grain. In such cases, and in the case of tangled grain, the two spider-cylinders B and L, with their retracting teeth, insure the rapid and continuous movement of the grain from the platform to the binder-deck, and the butt-hastening arms insure the clearance of the front lower corner of the binder-deck and prevent any collection of weeds or tangled grain thereon.

In the low-down self-binding harvester which I prefer, the packing and binding operations are performed by means of packing-arms and a binder-arm vibrating in vertical planes which are inclined from the cutter-bar rearwardly toward the drive-wheel end of the machine; and my present improvement is especially useful in that class of machines.

My butt-hastening arms have a considerable range of movement, and, by reason of their capacity for adjustment, they may, if desired, be caused to vibrate in vertical planes parallel with the plane in which the binder-arm vibrates.

The range of movement of the butt-hastening arms is such that the direction of movement of the grain delivered from the platform-carrier is changed and the stalks brought into positions approximating parallelism with the shaft of the binder-arm, and the grain is brought to a point within the range of movement of the packer-arms.

I claim as my invention—

1. In a self-binding harvesting-machine, the combination of a spider-cylinder arranged between the binder-deck and the platform-carrier, and provided with different series of retracting teeth, respectively mounted upon rock-shafts parallel to the axis of the spider-cylinder, and with means for causing the said teeth to be appropriately projected from and withdrawn into the spider-cylinder, the teeth of each series being interplaced relatively to the teeth of the adjoining series, whereby teeth mounted upon different rock-shafts move in different transverse planes.

2. In a spider-cylinder, the combination, with series of movable teeth, of means for appropriately projecting such teeth from and withdrawing them into the shell of the said cylinder, the teeth of each series lying at variable distances from each other in the direction of the length of the cylinder, those near the forward end of the cylinder being nearer together than those near the rear end of the cylinder, as shown and described.

3. The platform-carrier and the rotating spider-cylinder arranged between the platform-carrier and the binder-deck, in combination with butt-hastening arms vibrating upon orbitally-moving axes in vertical planes inclined rearwardly from the front part of the binder-deck toward the drive-wheel side of the machine, and suitable intermediate shafting and gearing connecting the said vibrating arms with the said rotating spider-cylinder.

4. An adjustable butt-board having affixed to it a frame for supporting butt-hastening arms and an upright rotating shaft which is concentric with the axis upon which the butt-board is rocked when undergoing adjustment, in combination with suitable intermediate gearing partly supported upon the butt-board for transmitting the power to operate the butt-hastening arms from the said upright shaft.

5. The vibrating butt-hastening arms J and J' and the crank-shaft I', supported upon the adjustable butt-board F, in combination with the counter-shaft H, also supported by the butt-board F, and connected by suitable bevel or miter gears with the crank-shaft I', and the upright shaft G, concentric with the axis of oscillation of the butt-board F.

JOHN F. APPLEBY.

Witnesses:
C. M. CASTLE,
E. B. GUMPERT.